Patented Jan. 15, 1952

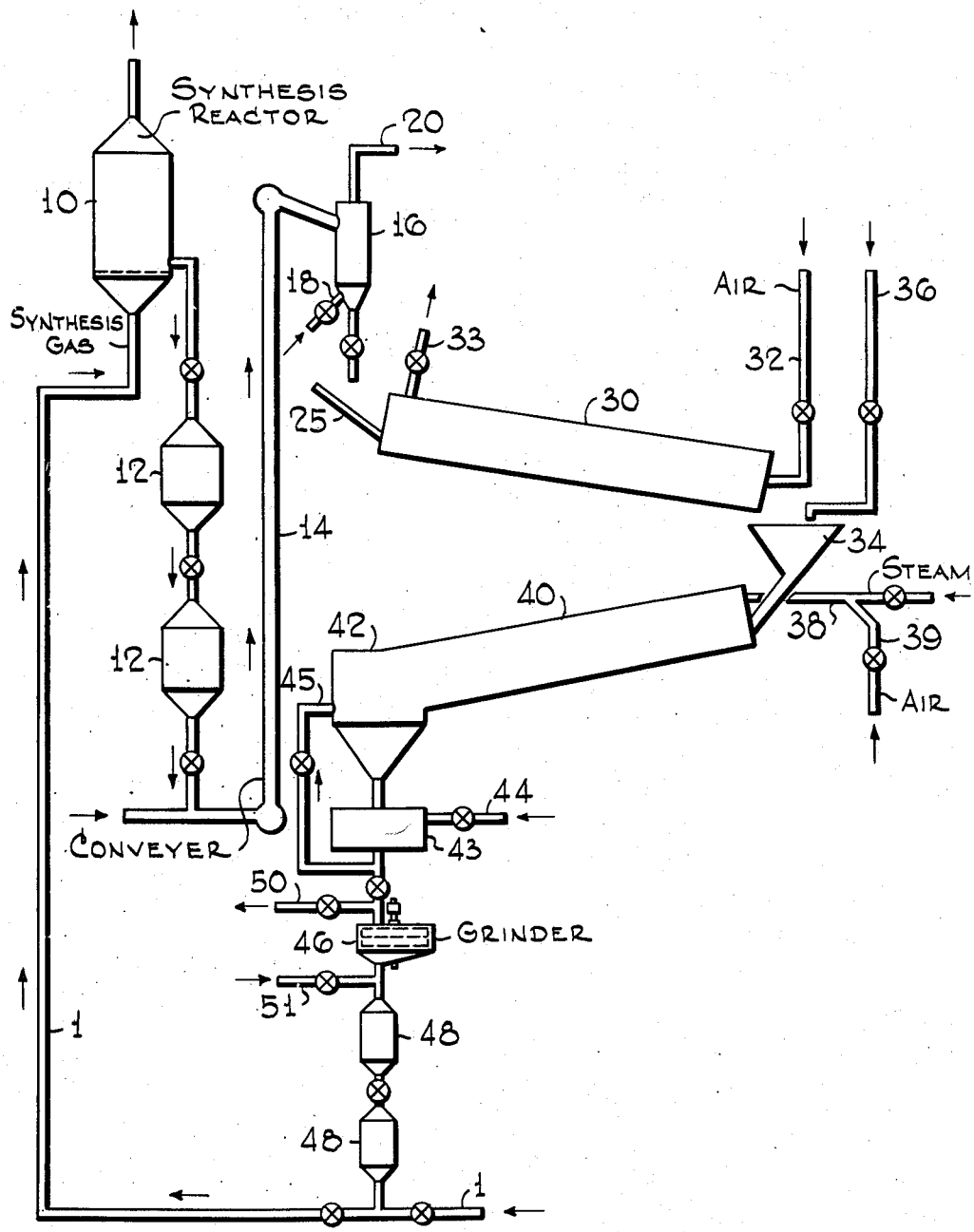

2,582,713

UNITED STATES PATENT OFFICE 2,582,713

REGENERATION OF FISCHER-TROPSCH CATALYST

Homer Z. Martin, Roselle, and Ivan Mayer, Summit, N. J., assignors to Standard Oil Development Company, a corporation of Delaware Application November 28, 1947, Serial No. 788,536

10 Claims. (Cl. 252—418)

This invention relates to the catalytic conversion of carbon oxides with hydrogen to form valuable synthetic products. The invention is more particularly concerned with an improved method of employing and reconditioning finely divided catalysts having a high activity and selectivity for the formation of normally liquid hydrocarbons in the catalytic conversion of carbon monoxide with hydrogen employing the so-called fluid solids technique.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product while at the higher temperatures (about 450°–750° F.) and higher pressures (about 5–25 atmospheres and higher) required for the production of unsaturated and branched-chain products of high antiknock value, iron-type catalysts are more suitable.

In both cases, the reaction is strongly exothermic and the utility of the catalyst declines steadily in the course of the reaction, partly due to the deposition of non-volatile conversion products such as carbon, paraffin wax, and the like, on the catalyst.

The extremely exothermic character and high temperature sensitivity of the synthesis reaction and the relatively rapid catalyst deactivation have led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis to the fluid solids technique has encountered serious difficulties, particularly with respect to catalyst deposits and their detrimental effects on the fluidization characteristics and mechanical strength of the catalyst.

As stated above, one of the most important modifications of the hydrocarbon synthesis requires the use of iron-type catalysts. These catalysts are the outstanding representatives of a group of catalysts which combine a high synthesizing activity and selectivity toward normally liquid products with a strong tendency to carbonize during the synthesis reaction, that is, to form fixed carbon or coke-like catalyst deposits which can not be readily removed by conventional methods of synthesis catalyst regeneration such as extraction, or the like.

These carbon deposits, when allowed to accumulate, weaken the catalyst structure and lead to rapid catalyst disintegration. The reduction of the true density of the catalyst resulting from its high content of low-density carbon coupled with the rapid disintegration of the catalyst particles causes the fluidized catalyst bed to expand, thereby reducing its concentration of catalyst and ultimately resulting in the loss of the catalyst bed because it becomes impossible to hold the catalyst in a dense phase at otherwise similar fluidization conditions. With these changes in fluid bed characteristics, the heat transfer from and throughout the bed decreases markedly, favoring further carbonization and accelerating the deterioration of the fluidity characteristics of the bed.

These difficulties may be overcome, quite generally, by subjecting the carbonized catalyst continuously or intermittently to a regenerating treatment by which carbon is burnt off the catalyst with the aid of an oxidizing gas. However, oxidative regeneration of the catalyst, if not carefully controlled with respect to the oxidation conditions, may frequently lead to an undesirable over-oxidation of the iron component of the catalyst. In addition, such catalyst fines of undesirably small particle size as have been formed prior to regeneration are not restored to the original readily fluidizable particle size by this regeneration treatment, particularly when carried out in fluid type regenerators. These fines may, therefore, continue to accumulate and eventually interfere with an efficient operation of the process unless they are discarded from the catalyst cycle, which, of course, constitutes an appreciable loss of valuable material.

The present invention overcomes these difficulties and affords various additional advantages as will appear from the following description wherein reference will be made to the accompanying drawing.

In accordance with the present invention, catalyst carbonized and disintegrated in the catalytic synthesis of hydrocarbons from CO and $H_2$ is continuously or intermittently subjected to a combined oxidation and sintering treatment with a free-oxygen containing gas such as air at temperatures of about 1400°–2000° F. followed by reduction at similar temperatures and grinding to a fluidizable particle size whereupon the catalyst is returned to the synthesis stage. Sintering temperatures in the neighborhood of 1400° F. or thereabove are generally suitable for iron catalysts. The reduction temperature may be the same or slightly lower than the sintering temperature. The catalyst is preferably cooled to about 100° to 200° F. prior to grinding. Since at the high temperatures here involved, substantial proportions of alkali metal promoters may be lost, the cool catalyst is preferably impregnated with a suitable solution of a promoter such as the halides, carbonates or hydroxides of sodium or potassium, prior to its return to the synthesis stage.

For the purpose of reduction, the relatively expensive hydrogen normally used as a reducing agent is replaced by a reducing atmosphere formed on the catalyst undergoing reduction, by contacting the oxidized and sintered catalyst with carbonaceous materials and air and/or steam at temperatures suitable for the reduction of the oxidized catalyst. Coke, coals, fuel oils and fuel gases including methane may be used as carbonaceous materials. In accordance with a preferred embodiment of the invention, sufficient carbon is left on the catalyst during the sintering treatment to react with steam and/or air admitted to the reducing zone so as to form a suitable reducing mixture, if necessary in cooperation with extraneous solid, liquid or gaseous fuel admitted to the reduction zone. Complete reduction to metal of the catalyst oxidized during the sintering treatment is frequently not required.

It has been found that at relatively high temperatures of about 1200° to 2000° F. it is possible to produce, by the reaction of steam with coke or other carbonaceous fuels, a gaseous mixture of hydrogen, water vapor, carbon monoxide and carbon dioxide which will be oxidizing with respect to carbon but will tend to reduce iron oxide to metallic iron. For this purpose, the feed ratio of steam to carbonaceous fuel should be so controlled that the values of the volumetric ratio $CO_2 : CO$ and the sum of the partial pressures $P_{CO} + P_{CO_2}$ stay below those given in the table below for various temperatures.

| Temperature, °F | 1100 | 1200 | 1300 | 1472 |
|---|---|---|---|---|
| $P_{CO} + P_{CO_2}$, atm | 0.132 | 0.42 | 1.32 | 6.14 |
| $P_{CO_2}/P_{CO}$ | 0.84 | 0.74 | 0.65 | 0.52 |
| Minimum $P_{CO_2}/P_{CO}$ | .50 | 0.44 | .36 | .30 |
| Oxide type | FeO | FeO | FeO | FeO |

This mode of operation is described and claimed specifically in the copending Martin, Mayer and Tyson application, Serial No. 788,538, filed of even date herewith and assigned to the same interests, which is here expressly referred to.

Operation in two subsequent sintering and reduction stages affords the advantage of high process flexibility. However, it is noted that satisfactory results may often be secured by treating the catalyst in a single stage at conditions conducive to decarbonization and sintering and simultaneous reduction of iron oxide by charging a mixture of steam, air and fuel, if necessary, to establish the gas composition just described in connection with the above table.

Any conventional type of sintering apparatus may be used for the purposes of the invention. Good results may be obtained when the sintering and/or reduction treatment is carried out in rotary kilns with concurrent or countercurrent flow of catalyst and treating gases. In accordance with a preferred embodiment of the invention, two rotary kilns are used in the first of which the catalyst is sintered and oxidized with countercurrently flowing air, while in the second kiln the catalyst is subjected to reduction with a concurrently flowing reducing gas mixture of the type specified above.

Having set forth its objects and general nature, the invention will be best understood from the more detailed description hereinafter in which reference will be made to the accompanying drawing, the single figure of which is a semi-diagrammatic illustration of a system suitable for carrying out a preferred embodiment of the invention.

Referring now to the drawing, the system illustrated therein essentially comprises a synthesis reactor 10, a sintering reactor 30 and a reduction reactor 40, whose functions and cooperation will be forthwith explained.

In operation, synthesis reactor 10 contains a dense, turbulent, fluidized mass of iron catalyst such as sintered pyrites ash promoted with about 1.5% of potassium carbonate and having an original particle size of about 20–100 microns, preferably 50–100 microns. Synthesis feed gas containing about 0.8–3.0 volumes of $H_2$ per volume of CO is supplied from line 1 to reactor 10 at a suitable synthesis pressure of 5–50 atm., preferably 20–40 atm. The synthesis temperature may be maintained between the approximate limits of 500°–800° F., preferably between about 550° and 700° F., by conventional methods of heat removal (not shown). Details of the operation of fluid synthesis reactors using iron catalysts are well known and need not be further specified here.

As stated before, carbon is deposited on the catalyst in reactor 10 and in about 100 hours as much as 50 lbs. of carbon may be deposited on each 100 lbs. of catalyst. This will tend to diminish the activity of the catalyst and also cause its physical disintegration so that fines having particle sizes smaller than 20 microns will be formed in excessive quantities. If this condition is not corrected, the density of the catalyst phase will drop rapidly and the entire catalyst will be eventually blown out of reactor 10. The present invention corrects this difficulty by subjecting the carbonized and partially disintegrated catalyst to an oxidative sintering treatment in reactor 30 followed by a reducing treatment in reactor 40 and by regrinding to the desired size as will appear more clearly hereinafter.

By way of example, it is assumed that 100 lbs. per hour of catalyst expressed as pure iron, containing about 15.5% coke on iron, 6.0% $O_2$ on iron, and about 40% of fines smaller than 20 microns particle size, is to be decarbonized and restored to its original particle size. The carbonized and partially disintegrated catalyst is withdrawn downwardly through a system of lock-hoppers 12 wherein the pressure may be reduced to atmospheric at which the catalyst may be treated in reactors 30 and 40.

After pressure release, the catalyst is conveyed by any suitable conventional mechanical or pneumatic conveying means 14 to a feed hopper 16. The catalyst in hopper 16 may be kept in a readily flowing state by admitting through line 18 an aerating gas, such as air, flue gas, steam, etc. which may be withdrawn through line 20. From hopper 16 the catalyst is fed by gravity via feeding means 25 to the upper end of reactor 30, which may have the form of a conventional rotary kiln. Simultaneously, air is blown from line 32 into the lower end of reactor 30. The amount of air admitted should be sufficient to heat the catalyst by combustion of coke to a temperature high enough to cause sintering of the catalyst and the formation of larger catalyst agglomerates from the fines present. Reaction temperatures of about 1200°–2000° F. are suitable for this purpose. Thus, reactor 30 may be so operated that an average temperature of about 1900° F. is maintained while about 90% of the carbon is burned off and about 15 to 35% by weight of oxygen is bound by the iron. An amount of about 5,000 to 9,000 standard cu. ft. of air per hour is suitable to establish these conditions in the case of the specific example here involved. If desired, heat may be removed from reactor 30 in any conventional manner, such as use of excess air, recirculation of cooled solids, injection of a water spray, etc. Spent oxidizing gas is removed through line 33, preferably after a suitable gas-solids separation in conventional equipment such as a cyclone separator (not shown) from which separated solids may be returned to reactor 30.

The sintered and oxidized catalyst is supplied at the outlet temperature of reactor 30, i. e. about 1500°–1900° F., from the lower end of reactor 30 to a feeding and mixing means 34 wherein it is mixed with subdivided coke or a similar carbonaceous fuel supplied from line 36. The mixture of sintered catalyst and fuel enters the upper end of reactor 40 which may likewise be a rotary kiln of suitable dimensions. Simultaneously with the solids feed, a mixture of steam and air is supplied to the upper end of reactor 40 from lines 38 and 39, respectively. The relative amounts of fuel, air and steam are so controlled that an atmosphere reducing with respect to iron oxide is formed within reactor 40 by the conversion of the fuel with steam into CO and $H_2$ while, at the same time, sufficient heat is generated by the combustion of fuel with air to support the endothermic water gas and reduction reactions. At the conditions of the present example, this may be accomplished by feeding about 15 to 25 lbs. of coke, 1,000 to 1,300 standard cu. ft. of air and 2 to 10 lbs. of steam. These proportions are based on a preheat of the air-steam mixture of about 500°–1500° F. in heat exchange with flue gases from reactor 30 and/or 40.

It will be appreciated that the gas at the inlet of reactor 40 is oxidizing with respect to both iron and coke, since it consists mainly of air and steam. However, in the lower portions of reactor 40 the air, steam and coke will have had opportunity to react and, therefore, gases reducing with respect to iron will be obtained. The temperature of the solids entering reactor 40 will be in the neighborhood of 1500° to 1900° F. at which the catalyst was removed from reactor 30. The temperature of the outlet gas and solids depends on the fuel, air and steam quantities and preheat.

In any case, the steam, air and coke rates may be so controlled that the desired gas composition is obtained prior to the discharge of the catalyst from reactor 40. Thus, it may be stated, quite generally, that for a discharge temperature of about 1500° F. these rates should be so controlled that the ratio of $CO_2$ to CO is less than about 0.5. At 1800° F. this ratio should be less than about 0.4. These conditions may be easily met by varying the quantity of steam charged to the kiln, no matter whether reactor 40 is heated externally or, as described above, operated substantially adiabatically by the admission of controlled amounts of air. The treatment of the catalyst with a $CO+H_2$ mixture rather than pure $H_2$ has, at relatively low temperatures within the ranges indicated above, the further advantage of suitably preconditioning the catalyst for the subsequent synthesis reaction, since it has been found that the carbonization tendency of iron catalysts may be substantially reduced by a pretreatment with CO at elevated temperatures conducive to carbide formation.

The sintered, decarbonized and reduced catalyst discharges from the lower end of reactor 40 into a quenching chamber 42 wherein the temperature of the catalyst may be reduced to about 400°–600° F., by heat exchange with catalyst cooled by quench water in vessel 43 and recirculated to chamber 42 through line 45 by any conventional means. Chamber 42 may have the function of, or comprise a conventional gas-solids separator, such as a cyclone. Quench water may be introduced through line 44. The catalyst cooled to about 200° F. passes, by gravity, into a conventional grinding and sizing device 46 from which it discharges at a particle size of about 50–100 microns into lockhopper system 48. Device 46 may comprise sieving and/or elutriation means suitable for properly sizing the ground catalyst. Particles of undesirably small size may be discarded through line 50 or returned to reactor 30 for resintering.

As a result of the high temperatures employed in reactors 30 and 40, substantial proportions of the alkali metal promoter content of the catalyst may be lost. This promoter may be advantageously replaced at any point of the system after it leaves quenching zone 42. For example, a suitable promoter solution, such as an aqueous solution of a potassium hydroxide, carbonate or halide, may be injected through line 51 into the catalyst leaving grinding device 46. Addition of the promoter at this or a similar point rather than in the synthesis reactor is of advantage since the catalyst at this point is free of oil and coke and the promoter may thus penetrate the catalyst much more effectively than if it is added to the catalyst in the synthesis reactor.

Properly sized regenerated and reduced catalyst may be passed from lockhoppers 48 at the synthesis pressure to synthesis gas feed line 1 to be returned therein as a dilute suspension of solids-in-gas to synthesis reactor 10 for reuse. The system illustrated by the drawing permits of various modifications. Reactors 30 and/or 40 may be operated at elevated pressures, if desired, so that pressure reduction on the catalyst may be substantially minimized. Either one or both lockhopper systems 12 and 48 may be replaced by standpipes or mechanical conveyors, if the pressure conditions permit. Concurrent rather than countercurrent flow of gases and solids may be applied to reactor 30.

As previously indicated, decarbonization, sintering and reduction may also be carried out in a single reactor of the type of reactors 30 and 40, by properly controlling the reaction temperature in combination with the composition of the regenerating atmosphere. For example, this may be accomplished by feeding spent catalyst, air, and steam (coke may be required in addition) to a reactor in concurrent flow, the air and steam being controlled so as to adjust the atmosphere at the kiln outlet.

Instead of using rotary kilns as reactors, either one or both of reactors 30 and 40 may be of the continuous moving grate or rotary rabble arm countercurrent stage type. Other modifications will appear to those skilled in the art without deviating from the spirit of the invention.

While the foregoing description and exemplary operation have served to illustrate specific applications and results of the invention, other modifications obvious to those skilled in the art are within the scope of the invention. Only such limitations should be imposed on the invention as are indicated in the appended claims.

We claim:

1. The process of maintaining a fluidizable particle size distribution and a low carbon concentration in a dense, turbulent, fluidized bed of finely divided carbonizing catalyst used in the synthesis of hydrocarbons from carbon monoxide and hydrogen, which comprises withdrawing carbonized catalyst containing fines having a particle size below the fluidizable range from said bed, subjecting said withdrawn catalyst in a sintering zone to an oxidizing sintering treatment adapted to remove carbon from the catalyst and simultaneously agglomerate catalyst fines to larger aggregates, subjecting the oxidized and sintered catalyst in a reducing zone to a reducing treatment in the absence of extraneous hydrogen with a reducing gas generated in said reducing zone by a reaction of steam and air with a carbonaceous fuel, controlling the temperature in said reducing zone by controlling the amounts of air and steam introduced thereto, grinding the reduced catalyst to a fluidizable particle size, and returning ground catalyst to said bed.

2. The process of claim 1 wherein the catalyst is subjected to a tumbling motion in at least one of said zones.

3. The process of claim 1 in which said sintering and reducing treatments are carried out at a temperature of about 1400°–2000° F.

4. The process of claim 1 wherein a portion of said fuel is coke left on said catalyst after said sintering treatment.

5. The process of claim 1 in which said ground catalyst is cooled to a temperature below about 400° F. and an alkali metal promoter is added to said cooled catalyst prior to its return to said bed.

6. The process of maintaining a fluidizable particle size distribution and a low carbon concentration in a dense, turbulent, fluidized bed of finely divided carbonizing iron-type catalyst used in the synthesis of hydrocarbons from carbon monoxide and hydrogen, which comprises withdrawing carbonized catalyst containing fines having a particle size below the fluidizable range from said bed, subjecting said withdrawn catalyst to a high temperature treatment with oxidizing gases in the absence of extraneous hydrogen, said treatment being adapted to remove carbon from said catalyst, to sinter said catalyst so as to form larger aggregates from said catalyst fines, and to reduce iron oxide to iron, grinding said heat-treated catalyst to a fluidizable particle size and returning ground catalyst to said bed.

7. The process of claim 6 wherein said heat treatment is carried out in a single zone to which air, steam and carbonaceous fuel are supplied in proportions adequate to maintain a sintering temperature and an atmosphere oxidizing to carbon but reducing to iron oxide.

8. The process of claim 7 in which said catalyst subsequent to being subjected to said reducing treatment is cooled by heat exchange with quenched reduced catalyst and thereafter quenched in water.

9. The process of claim 7 wherein said fuel is comprised of the carbonaceous deposit formed on said catalyst during the hydrocarbon synthesis reaction.

10. The process of claim 7 in which said sintering and reduction treatment is carried out at a temperature of about 1400° to 2000° F.

HOMER Z. MARTIN.
IVAN MAYER.

REFERENCES CITED

The following references are of record in the file of this patent:

UNITED STATES PATENTS

| Number | Name | Date |
|---|---|---|
| 133,202 | Chubb | Nov. 19, 1872 |
| 1,562,550 | Hall | Nov. 24, 1925 |
| 1,598,967 | Hiller | Sept. 7, 1926 |
| 1,915,362 | Hanks et al. | June 27, 1933 |
| 2,183,146 | Michael | Dec. 12, 1939 |
| 2,234,246 | Groombridge | Mar. 11, 1941 |
| 2,254,806 | Michael | Sept. 2, 1941 |
| 2,337,684 | Scheineman | Dec. 28, 1943 |
| 2,358,039 | Thomas et al. | Sept. 12, 1944 |
| 2,360,787 | Murphree et al. | Oct. 17, 1944 |
| 2,393,909 | Johnson | Jan. 29, 1946 |
| 2,417,164 | Huber, Jr. | Mar. 11, 1947 |
| 2,420,049 | Martin | May 6, 1947 |
| 2,438,584 | Stewart | Mar. 30, 1948 |
| 2,455,419 | Johnson | Dec. 7, 1948 |
| 2,462,861 | Gunness | Mar. 1, 1949 |
| 2,467,803 | Herbst | Apr. 19, 1949 |
| 2,479,420 | Segura | Aug. 16, 1949 |
| 2,483,850 | Segura et al. | Oct. 4, 1949 |
| 2,510,823 | Krebs | June 6, 1950 |